United States Patent [19]

Gruber et al.

[11] 3,987,019

[45] Oct. 19, 1976

[54] ANAEROBICALLY HARDENING ADHESIVES AND SEALANTS CONTAINING AN ORGANIC SULFONYL HYDRAZONES

[75] Inventors: Werner Gruber, Dusseldorf-Gerresheim; Joachim Galinke, Dusseldorf-Holthausen; Jurgen Keil, Monheim-Hitdorf, all of Germany

[73] Assignee: Henkel & Cie G.m.b.H., Dusseldorf-Holthausen, Germany

[22] Filed: Aug. 25, 1975

[21] Appl. No.: 607,466

[30] Foreign Application Priority Data

Sept. 2, 1974   Germany............................ 2442001

[52] U.S. Cl............................. 526/328; 151/14.5; 156/310; 156/332; 427/409; 428/458; 428/463; 428/542; 526/219; 526/227; 526/232; 526/236

[51] Int. Cl.$^2$............... C08F 218/00; C08F 120/02; B32B 7/00

[58] Field of Search....... 260/80.81, 86.1 E, 89.5 A, 260/45.9 R

[56] References Cited

UNITED STATES PATENTS

| | | | |
|---|---|---|---|
| 2,895,950 | 7/1959 | Krieble | 260/89.5 |
| 3,043,820 | 7/1962 | Krieble | 260/89.5 |
| 3,218,305 | 11/1965 | Krieble | 260/89.5 |
| 3,491,076 | 1/1970 | Bachman | 260/88.5 |
| 3,625,930 | 12/1971 | Tobach et al. | 260/89.5 |
| 3,658,624 | 4/1972 | Lees | 156/310 X |
| 3,682,875 | 8/1972 | O'Sullivan et al. | 260/89.5 R |

*Primary Examiner*—Joseph L. Schofer
*Assistant Examiner*—Herbert J. Lilling
*Attorney, Agent, or Firm*—Hammond & Littell

[57] ABSTRACT

Organic sulfonyl hydrazones are accelerators for aerostable, anaerobically-setting adhesive compositions. They provide rapid setting of the adhesive with formation of bonds of good strength, and have little adverse effect upon the storage stability of the compositions when access of molecular oxygen is permitted.

19 Claims, No Drawings

ANAEROBICALLY HARDENING ADHESIVES AND SEALANTS CONTAINING AN ORGANIC SULFONYL HYDRAZONES

FIELD OF THE INVENTION

The present invention relates to systems based on (meth) acrylic esters and organic peroxides, particularly hydroperoxides, which harden in the absence of oxygen at an accelerated rate, and which are known as aerostable anaerobically setting adhesives, sealing compounds, etc. They are used preferably in solvent-free form for the above-mentioned purposes. The invention includes methods for the preparation of the compositions.

As essential components these systems contain monomeric or oligomeric (meth) acrylic esters of mono- or polyhydroxy alcohols as well as a peroxide or hydroperoxide. Preferably the alcohols have molecular weights below about 700. To ensure a sufficiently rapid hardening in the absence of oxygen, accelerators are added to the system.

It is known that certain nitrogen-containing compounds can be used as accelerators. With compounds of this type one obtains after a not too long a time a strength which permits the cemented objects to be handled. The strength of the bonds obtained is generally evaluated according to the so-called "hand strength" test. In this test a few drops of the aerostable, anaerobically hardening adhesive composition are applied for example to the threads of a degreased bolt, after which the appropriate nut is screwed over the bolt. From time to time the nut is twisted slightly against the bolt to determine if the adhesive has set. The time that elapses until the nut can no longer be turned by hand is used as the measure of hand strength.

Of greater importance for the use of the anaerobically hardening adhesives and sealing compounds, however, is the time required for the adhesive on the bolts to fail under a torque of at least 50 kpcm.

RELATED ART

A variety of compositions of the foregoing type are disclosed in U.S. Pat. Nos. 2,626,178; 2,895,950; 3,041,322; 3,043,820; 3,300,547; 3,046,262; 3,218,305; and 3,425,988.

OBJECTS OF THE INVENTION

A principal object of the present invention is to find accelerators for use in adhesive and sealing compositions of the type described which lead very rapidly to a force-locked connection after the parts have been joined together and which yet have no adverse effect upon the storage stability of the compositions, i.e., they are substantially inert in the presence of free oxygen.

A still further object is to provide a method for accelerating the rate at which aerostable, anaerobically-setting compositions containing a polymerizable meth (acrylate) ester as principal latent adhesive component harden in the absence of free oxygen, by uniformly incorporating in said composition a small but effective amount of an organic sulfonyl hydrazone as agent which accelerates the action of the catalyst.

BRIEF SUMMARY OF THE INVENTION

The present invention provides an aerostable, anaerobically setting adhesive composition comprising a polymerizable (meth) acrylate ester as principal latent adhesive component, a peroxide polymerization catalyst for the ester, and a hydrazone as accelerator for the catalyst. The composition may contain one or more stabilizer and one or more auxiliary accelerators. In preferred embodiments they are adequately stable at room temperature in the presence of free oxygen, but harden rapidly when used as a cement with exclusion of air, and provide strong metal-to-metal bonds.

According to the invention the new anaerobically hardening adhesives and sealing systems based on (meth) acrylic esters contain, in addition to the usual auxiliary substances, organic sulfonyl hydrazones of the general formula

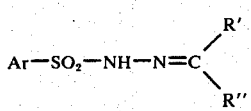

wherein Ar denotes an aromatic radical (which may be substituted); R' and R" an alkyl, cycloalkyl, or aryl radical, which likewise may be substituted; wherein R' also denotes H; and R' and R" can form a ring enclosing the carbon. Preferably the sulfonyl hydrazones are used in an amount of 0.01% to 10% by weight, particularly 0.1% to 5% by weight, based on the weight of the (meth) acrylic ester.

According to the invention, the new anaerobically hardening adhesives and sealing compounds based on (meth) acrylic acid esters contain hydrazones in addition to the usual auxiliary substances. Preferably the hydrazones are present in an amount between 0.01% and 10% (particularly 0.1% to 5%) by weight based on the weight of the (meth) acrylic acid ester. The hydrazones act as accelerators for the polymerization catalyst normally present.

The hydrazones can also be substituted; it is important however, that the typical hydrazone grouping =N—N=C= appear at least once in the molecule.

Thus in preferred embodiments the compositions of the present invention contain an adhesive component [e.g., a (meth) acrylate ester]; a polymerization initiator or catalyst (e.g., a hydroperoxy alcohol); an oxygen adjuvant as polymerization inhibitor (e.g., a quinone); a stabilizer (e.g., a percarboxylic acid); a primary accelerator (an organic sulfonyl hydrazones); and an auxiliary accelerator (e.g., a tertiary amine). The components are mutually soluble or homogeneously dispersible.

Suitable aromatic sulfonic hydrazides, from which the sulfonyl hydrazones to be used according to the invention are derived, are, for example, benzene sulfonic hydrazide; o- and p-toluene sulfonic hydrazide; the isomeric xylene sulfonic hydrazides; α- and β-naphthalene sulfonic hydrazides; p-chlorobenzene sulfonic hydrazide; p-bromobenzene sulfonic hydrazide; and toluene sulfonic hydrazides substituted with chlorine or bromine. As ketone components for the formation of these sulfonyl hydrazones can be used, for example, the following ketones: acetone, butanone, diisopropyl ketone, methyl isobutyl ketone, hexanone-2, hexanone-3, methyl dodecyl ketone, methyl hexadecyl ketone, cyclohexanone, cyclopentanone, acetylacetone, acetoacetic ester, acetophenone, benzophenone and p-ditolyl ketone. Preferably the aromatic sulfonic hydrazides are aromatic hydrocarbon sulfonic hydrazides having from 6 to 12 carbon atoms and their mono- and diring-halogenated derivatives. Preferably the ketone components of the sulfonyl hydrazones are alkanones having from 3 to 20 carbon atoms, cycloalkanones having from 5 to 8 carbon atoms, alkanoylbenzene having from 8 to 20 carbon atoms, di-aromatic hydrocarbon ketones having from 12 to 20 carbon atoms, alkanediones having from 5 to 20 carbon atoms and lower alkyl alkanonates having from 4 to 8 carbon atoms and one ketone in the alkanonoate moiety.

The sulfonyl hydrazones according to the invention can be used principally in all so-called anaerobically hardening adhesives and sealing compounds. These systems are composed, for example, of (meth)-acrylic esters of polyhydroxy alcohols having a molecular weight less than about 700, such as ethylene glycol; diethylene glycol; triethylene glycol; tetraethylene glycol; polyethylene glycol; glycerin; pentanediol; di, tri-, or tetrapropylene glycol; or the (meth)acrylic esters of dimerized or polymerized cyclopentadienol, of tetrahydrofuryl alcohol, of cyclopentanol, or of cyclohexanol. The reaction products of glycide ethers of polyvalent phenols with acrylic acid or methacrylic acid provide another group of anaerobically hardening adhesives.

Another essential component of the anaerobically hardening adhesives are the peroxide initiators. These are primarily hydroperoxides which derive from hydrocarbons with a chain length of 3 to 18 C-atoms. Suitable, for example, are cumene hydroperoxide, tert. butyl hydroperoxide, methylethyl ketone hydroperoxide, and diisopropyl-benzenehydroperoxide. Furthermore those peroxides are also suitable which have a half life period of 10 hours at a temperature between about 80° and 140 °C. Here we mention particularly tert. butyl perbenzoate, di-tert.-butyl-diperoxyphthalate, 2,5-dimethyl-2,5-bis-(tert.-butylperoxy)-hexane, bis-(1-hydroxy-cyclohexyl)-peroxide, tert. butyl-peroxyacetate, 2,5-dimethylhexyl-2,5-di-(peroxybenzoate), tert. butylperoxyisopropyl carbonate, n-butyl-4, 4-bis-(tert.-butylperoxy)valerate, 2,2-bis-(tert.-butylperoxy)- butane and di-tert.-butyl peroxide.

The peroxides should be present in an amount of 0.1% to 20%, preferably 1.0% to 10%, based on the total weight of the mixture. They are used mostly as phlegmatized (i.e., thickened) solutions or pastes, that is, with a relatively low content of inert substances, for example, dimethyl phthalate, cumene or the like.

According to a preferred embodiment of the invention, stabilizers are added to the anaerobically hardening mixtures, particularly if they contain arylalkyl- and/or dialkyl hydrazones. The stabilizers prevent premature polymerization; that is, they improve the stability of the compositions during storage. Beyond that, they have an accelerating effect on the polymerization of the methacrylic esters under anaerobic conditions. The stabilizers thus possess a double function. Suitable substances which have these properties are, for example, aliphatic monopercarboxylic acids (particularly peracetic acid) and nitrones, like C-phenyl-N-methylnitrone. The use of small amounts (e.g., 0.1% to 5.0% by weight) is generally sufficient.

In addition to the foregoing, the composition may contain a free radical stabilizer, to prevent gelations when oxygen alone is insufficient for the purpose. Quinones (for example, hydroquinone) are preferred stabilizers for this purpose.

According to another preferred embodiment of the present invention, an organic amine can be used additionally as an auxiliary accelerator together with the sulfonyl hydrazone accelerator according to the invention. In this case the systems shows their best properties regarding a rapid hardening time. As auxiliary accelerators are mentioned N,N-dimethyl-o-toluidine, N,N-dimethyl-p-toluidine and tri-n-butylamine. They should be used only in very small amounts of 0.1% or up to 2.5% by weight. The auxiliary accelerators are preferably used together with the above-mentioned stabilizers. The amounts of stabilizer depends on the quantative ratios between the hydrazone and the auxiliary amine accelerators. They can be easily adapted to each other by simple preliminary tests to obtain an optimum hardening time and good stability.

Finally thickeners, plasticizers, inorganic fillers and dyes can be added to the adhesive and sealing compounds according to the invention. Suitable as thickeners are polymeric compounds such as polymethyl methacrylate, polyethyl acrylate, polystyrene, polyvinyl chloride, synthetic rubber and the like. As fillers can be used, for example, finely-divided silicon dioxide, silicates, bentonites calcium carbonate, and titanium dioxide.

The anaerobic adhesives and sealing compounds according to the invention can be stored for months in only partly-filled bottles of glass, polyethylene, etc., without undergoing any change. A relatively low oxygen-partial pressure suffices to inhibit the polymerization. Here as well as in other cases it was found expedient to color the bottles to keep out short-wave light. This has a favorable effect on the stability.

The anaerobically-hardening adhesives are used in the industry for cementing metal sheets or metal parts of different materials or for fastening threads, for sealing pipe joints, etc. Due to the combination according to the invention it is not necessary to use an additional accelerator, even with relatively inactive metal surfaces. Naturally it is also possible to accelerate the hardening with known means, for example, by slight heating.

In general, so-called hand-resistant joints are obtained after a few minutes with the anaerobic adhesives according to the invention. It should be pointed out that the time to obtain a really good strength which permits practical handling, namely, breaking bolt-nut joints with a torque of at least 50 kpcm, is between about 10 and 30 minutes.

In the specification and claims, the term "(meth) acrylate" is used to designate esters of acrylic acid and the esters of methacrylic acid. The esters are termed latent adhesives because they do not develop their adhesive properties until they have polymerized.

The invention is further described in the examples which follow. These examples are preferred embodiments of the invention and are not to be construed in limitation thereof.

EXAMPLES 1 to 4

100 g of technical polyethylene glycol methacrylate (m.w. approx. 330), which contained 200 p.p.m. of hydroquinone, was mixed with stirring with the amounts of the organic hydrazones shown in Table 1, col. 2, as accelerator. Subsequently 1.1 g of N,N-dimethyl-p-toluidine and then 5.5 g of a commercial 70% cumene-hydroperoxide solution were stirred in. As a last component was added 40% commercial peracetic acid in glacial acetic acid as a stabilizer (see Table 1 column 3).

TABLE 1

| Ex. | Accelerator | Peracetic acid |
|---|---|---|
| 1 | 1.1 g Methyl ethyl ketone tosyl hydrazone | 1.1 g |
| 2 | 0.55 g Methyl ethyl ketone tosyl hydrazone | 0.55 g |
| 3 | 1.1 g Acetone-tosyl hydrazone | 1.1 g |
| 4 | 0.55 g Acetone-tosyl hydrazone | 0.55 g |
| 5 | 1.1 g Cyclohexanone-tosyl hydrazone | 1.1 g |
| 6 | 1.1 g Cyclohexanone-tosyl hydrazone | 0.55 g |
| 7 | 1.1 g Acetacetic ester tosyl hydrazone | 1.1 g |

The products of Examples 1 to 7 were tested for:
A. Hand strength
B. Time to resist a torsional force of 50 kpcm.
C. Strength after 24 hours
D. Stability

A. Hand Strength Test

In the hand strength test a few drops of the anaerobically hardening adhesive are placed on the threads of a degreased bolt (M 10 × 30 DIN 933—8.8)

and the appropriate nut is screwed over the bolt. From time to time the nut is turned a little against the bolt to determine at what time the nut can no longer be turned by hand on the bolt. The elapsed time is used as a measure of the hand strength and is shown in Table 2 below.

B. Time for Attaining a Torque of at least 50 kpcm.

The strength test is carried out on degreased bolts (M 10 × 30 DIN 933—8.8) and nuts. After the bolt has been joined to the nut with a few drops of the adhesive the torque necessary to break the adhesive joint is determined with a torque wrench at intervals of several minutes. As measure for the strength is considered the time at which the torque of 50 kpcm or more is obtained. Mean values of five measurements are listed in column 3 of Table 2.

C. Strength after 24 hours

The torque in kpcm required to break the adhesive bond between the nut and bolt after 24 hours of storage at room temperature was determined with a torque wrench. It is listed in column 4 of Table 2 below.

D. Stability

In the stability test, a test tube 10 cm long and 10 mm wide was 9/10 filled with the mixture according to Examples 1 to 12 and suspended in a bath maintained at 80° C. The time span from the hanging in the bath to the first formation of gel was measured. All samples were still gel-free after one hour. The values respecting the hand strength, the time of the 50 kpcm strength and the strength after 24 hours were unchanged. The accelerated aging test was stopped because this test shows that the products remain unchanged for over a year at room temperature.

TABLE 2

| Ex. | Hand Strength (minutes) | 50 kpcm Torque (minutes) | Strength After 24 hrs. (kpcm) |
|---|---|---|---|
| 1 | 3 | 20 | 140 |
| 2 | 3 | 25 | 140 |
| 3 | 3 | 20 | 140 |
| 4 | 3 | 20 | 120 |
| 5 | 4 | 25 | 140 |
| 6 | 3 | 10 | 150 |
| 7 | 5 | 25 | 200 |

We claim:

1. In an aerostable, anaerobically-setting adhesive composition comprising a polymerizable (meth) acrylate ester as principal latent adhesive component and a peroxide polymerization catalyst therefor: a small effective uniformly distributed amount of an organic sulfonyl hydrazone as accelerator for said catalyst.

2. A composition according to claim 1 wherein the accelerator is methyl ethyl ketone tosyl hydrazone.

3. A composition according to claim 1 wherein the accelerator is acetone tosyl hydrazone.

4. A composition according to claim 1 wherein the accelerator is cyclohexanone tosyl hydrazone.

5. A composition according to claim 1 wherein the accelerator is acetoacetic ester tosyl hydrazone.

6. A composition according to claim 1 containing an organic amine as auxiliary accelerator.

7. A composition according to claim 6 wherein the auxiliary accelerator is N,N-dimethyl toluidine.

8. A composition according to claim 1 wherein the (meth) acrylate ester is the ester of two mols of methacrylic acid with one mole of ethylene glycol.

9. A composition according to claim 1 wherein the polymerization catalyst is a hydroperoxide.

10. A composition according to claim 1 wherein the polymerization catalyst is cumene hydroperoxide.

11. A composition according to claim 1 wherein the composition contains a stabilizer.

12. A composition according to claim 11 wherein the stabilizer is peracetic acid.

13. A composition according to claim 11 wherein the stabilizer is N-methyl-C-phenyl nitrone.

14. A composition according to claim 1 containing a free radical stabilizer.

15. A composition according to claim 14 wherein the free radical stabilizer is hydroquinone.

16. A method for accelerating the setting rate of an aerostable, anaerobically-setting adhesive composition comprising a polymerizable (meth) acrylate ester as principal latent adhesive component and a peroxide polyermization catalyst therefor, which comprises uniformly incorporating in said composition a small but effective amount of an organic sulfonyl hydrazone as accelerator.

17. A method according to claim 16 wherein said hydrazone is incorporated in said composition prior to said catalyst.

18. A composition of matter according to claim 1, wherein the sulfonyl hydrazone is derived from aromatic sulfonic hydrazides having from 6 to 12 carbon atoms and a ketone.

19. A composition of matter according to claim 1, wherein the sulfonyl hydrazone is derived from aromatic sulfonic hydrazides having from 6 to 12 carbon atoms and the mono- and di- ring-halogenated derivatives thereof and a ketone selected from the group consisting of $C_3$—$C_{30}$ alkanones, $C_5$—$C_8$ cycloalkanones, $C_8$—$C_{20}$ alkanoylbenzenes, $C_{12}$—$C_{20}$ di-aromatic hydrocarbon ketones, $C_5$—$C_{20}$ alkanediones, and lower alkanonates containing 4 to 8 carbon atoms and one ketonic group in the alkanonoate moiety.

* * * * *